(12) United States Patent
Xu et al.

(10) Patent No.: US 9,325,189 B2
(45) Date of Patent: Apr. 26, 2016

(54) BATTERY, AND METHOD, DEVICE, AND SYSTEM FOR BATTERY PROTECTION

(71) Applicant: Xiaomi Inc., Beijing (CN)

(72) Inventors: Bing Xu, Beijing (CN); Zhijie Li, Beijing (CN); Pengfei Zhang, Beijing (CN)

(73) Assignee: Xiaomi Inc., Beijing (CN)

( * ) Notice: Subject to any disclaimer, the term of this patent is extended or adjusted under 35 U.S.C. 154(b) by 0 days.

(21) Appl. No.: 14/460,549

(22) Filed: Aug. 15, 2014

(65) Prior Publication Data

US 2015/0119116 A1   Apr. 30, 2015

Related U.S. Application Data

(63) Continuation of application No. PCT/CN2014/076981, filed on May 7, 2014.

(30) Foreign Application Priority Data

Oct. 25, 2013   (CN) .......................... 2013 1 0511991

(51) Int. Cl.
*H04B 1/38* (2015.01)
*H02J 7/00* (2006.01)
(Continued)

(52) U.S. Cl.
CPC ................ *H02J 7/0063* (2013.01); *G06F 1/28* (2013.01); *H02J 7/0004* (2013.01); *H04B 1/3888* (2013.01); *H02J 2007/0001* (2013.01); *H02J 2007/0067* (2013.01)

(58) Field of Classification Search
CPC ................ H02J 7/0004; H02J 7/0063; H02J 2007/0067; H02J 2007/0001; G06F 1/28; H04B 1/3888

USPC ................ 455/573, 572, 574, 550.1
See application file for complete search history.

(56) References Cited

U.S. PATENT DOCUMENTS

| 6,605,922 B2 | 8/2003 | Tamai et al. |
| 7,506,183 B2 | 3/2009 | Araya |
| 7,619,536 B2 * | 11/2009 | Nakashima ........ G01R 31/3682 320/106 |

(Continued)

FOREIGN PATENT DOCUMENTS

| CN | 1177269 A | 3/1998 |
| CN | 1292163 A | 4/2001 |

(Continued)

OTHER PUBLICATIONS

European Search Report for Application No. 14189115.0-1804, from the European Patent Office mailed Mar. 9, 2015.

(Continued)

*Primary Examiner* — Khai M Nguyen
(74) *Attorney, Agent, or Firm* — Finnegan, Henderson, Farabow, Garrett & Dunner LLP (57) ABSTRACT

A battery for electronic equipment includes: a rechargeable power supply; and a battery chip, wherein: the rechargeable power supply is configured to supply power to the electronic equipment; and the battery chip is configured to detect whether the rechargeable power supply has started to supply power to the electronic equipment and, if a detection result is that the rechargeable power supply has started to supply power to the electronic equipment, transmit a customized signal to the electronic equipment through a predetermined transmitting pin.

12 Claims, 8 Drawing Sheets

(51) Int. Cl.
*G06F 1/28* (2006.01)
*H04B 1/3888* (2015.01)

(56) References Cited

U.S. PATENT DOCUMENTS

| | | | |
|---|---|---|---|
| 2003/0102842 A1 | 6/2003 | Tamai et al. | |
| 2005/0057216 A1 | 3/2005 | Yamaguchi et al. | |
| 2006/0108972 A1 | 5/2006 | Araya | |
| 2008/0150477 A1 | 6/2008 | Nakashima et al. | |
| 2008/0266126 A1 | 10/2008 | Nakashima et al. | |
| 2009/0280396 A1 | 11/2009 | Nakashima et al. | |
| 2013/0170086 A1* | 7/2013 | Li | H02H 7/18 361/91.2 |

FOREIGN PATENT DOCUMENTS

| | | |
|---|---|---|
| CN | 1421954 A | 6/2003 |
| CN | 1462086 | 12/2003 |
| CN | 1783574 A | 6/2006 |
| CN | 1801636 A | 7/2006 |
| CN | 101266277 A | 9/2008 |
| CN | 101854067 | 10/2010 |
| CN | 102280669 | 12/2011 |
| CN | 102510111 | 6/2012 |
| CN | 103606718 A | 2/2014 |
| EP | 0644642 | 3/1995 |
| EP | 1667306 | 11/2005 |
| EP | 1 857 828 A1 | 11/2007 |
| EP | 1938170 | 7/2008 |
| JP | S6070674 | 4/1985 |
| JP | 2006-101617 A | 4/2006 |
| JP | 2006-114423 | 4/2006 |
| JP | 2006-250718 A | 9/2006 |
| JP | 20060279844 | 10/2006 |
| JP | 2012-129015 A | 7/2012 |
| KR | 20130050300 | 5/2013 |
| TW | 242714 | 3/1995 |
| WO | WO 00/45495 | 8/2000 |

OTHER PUBLICATIONS

English Translation of International PCT Search Report for Application No. PCT/CN2014/076981 mailed Aug. 8, 2014, from the State Intellectual Property Office of China.
International PCT Search Report for Application No. PCT/CN2014/076981, from the State Intellectual Property Office of China, mailed Aug. 8, 2014.
M Chen et al., The Design of a Li-Ion Battery Protection IC for Single-Cell Pack, *Microprocessors*, No. 1, Feb. 2008.
L Sun et al., A Design of Protective Chip for Lithium Ion Battery, Journal of Wuxi Institute of Commerce, vol. 8, No. 6, Dec. 2008.
Office Action for Korean Patent Application No. 10-2014-7021332, from the Korean Patent Office, dated Nov. 12, 2015.
Office Action for Russian Patent Application No. 2015124944/07(038836), from the Russian Patent Office, dated Jan. 18, 2016.

* cited by examiner

BATTERY, AND METHOD, DEVICE, AND SYSTEM FOR BATTERY PROTECTION

CROSS REFERENCE TO RELATED APPLICATION

This application is a continuation of International Application No. PCT/CN2014/076981, filed May 7, 2014, which claims priority from Chinese Patent Application No. 201310511991.5, filed Oct. 25, 2013, the entire contents of all of which are incorporated herein by reference.

TECHNICAL FIELD

The disclosure generally relates to the field of power supply and, more particularly, to a battery and a method, a device, and a system for battery protection.

BACKGROUND

Along with the development of electronic equipment, such as a mobile phone, a tablet computer, and the like, at the same time that the electronic equipment meets the needs of users, safety issues of the electronic equipment have gradually been put on the agenda. For example, battery protection has become increasingly important for the electronic equipment.

Taking mobile phones for example, some manufacturers make and sell imitation batteries. Although the imitation batteries may have a lower price as compared with original batteries, the imitation batteries may have a lower quality, which will not only damage the mobile phones but also cause safety issues to users.

SUMMARY

According to a first aspect of the present disclosure, there is provided a battery for electronic equipment, comprising: a rechargeable power supply; and a battery chip, wherein: the rechargeable power supply is configured to supply power to the electronic equipment; and the battery chip is configured to detect whether the rechargeable power supply has started to supply power to the electronic equipment and, if a detection result is that the rechargeable power supply has started to supply power to the electronic equipment, transmit a customized signal to the electronic equipment through a predetermined transmitting pin.

According to a second aspect of the present disclosure, there is provided a method for use in a battery for electronic equipment, comprising: detecting whether the battery has started to supply power to the electronic equipment; and if a detection result is that the battery has started to supply power to the electronic equipment, transmitting a customized signal to the electronic equipment through a predetermined transmitting pin of the battery.

According to a third aspect of the present disclosure, there is provided a method for battery protection for use in electronic equipment, comprising: receiving a customized signal transmitted from a battery through a predetermined receiving pin; recognizing whether the customized signal is correct; and if the customized signal is incorrect, controlling the electronic equipment to cut off power supplied by the battery.

According to a fourth aspect of the present disclosure, there is provided electronic equipment, comprising: a processor; and a memory for storing instructions executable by the processor, wherein the processor is configured to: receive a customized signal transmitted from a battery through a predetermined receiving pin; recognize whether the customized signal is correct; and if the customized signal is incorrect, control the electronic equipment to cut off power supplied by the battery.

According to a fifth aspect of the present disclosure, there is provided a non-transitory storage medium having stored therein instructions that, when executed by a processor of electronic equipment, cause the electronic equipment to perform a method for battery protection, the method comprising: receiving a customized signal transmitted from a battery through a predetermined receiving pin; recognizing whether the customized signal is correct; and if the customized signal is incorrect, controlling the electronic equipment to cut off power supplied by the battery.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate embodiments consistent with the invention and, together with the description, serve to explain the principles of the invention.

DESCRIPTION OF THE EMBODIMENTS

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the invention. Instead, they are merely examples of apparatuses and methods consistent with aspects related to the invention as recited in the appended claims.

Figure 1:
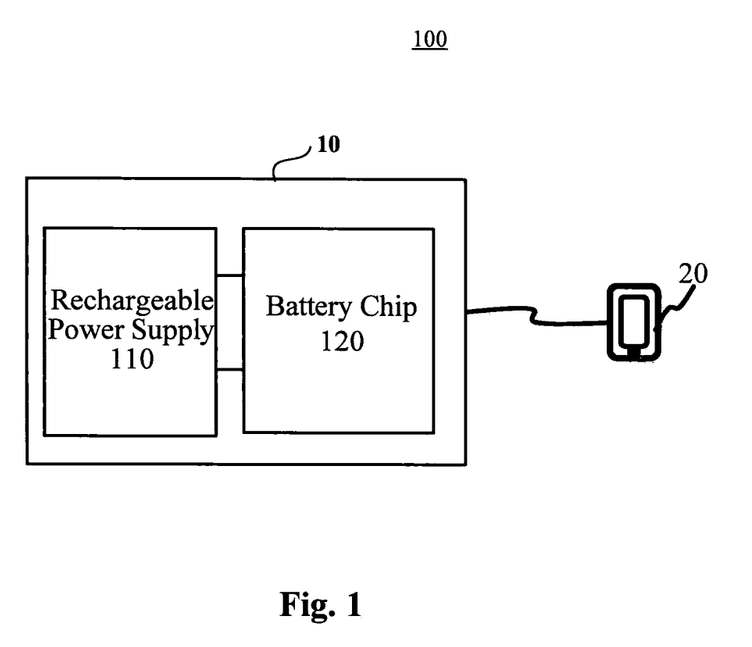
FIG. 1 is a block diagram of a system for battery protection, according to an exemplary embodiment.

FIG. 1 is a block diagram of a system 100 for battery protection, according to an exemplary embodiment. Referring to FIG. 1, the system 100 includes a battery 10 and electronic equipment 20.

The battery 10 includes a rechargeable power supply 110 and a battery chip 120.

The rechargeable power supply 110 is configured to supply power to the electronic equipment 20, so as to facilitate normal operation of the electronic equipment 20.

The battery chip 120 is configured to detect whether the rechargeable power supply 110 has started to supply the power to the electronic equipment 20 and, if the detection result is that the rechargeable power supply 110 has started to supply the power to the electronic equipment 20, transmit a customized signal to the electronic equipment 20 through a predetermined transmitting pin.

The battery 10 and the electronic equipment 20 are connected through the predetermined transmitting pin.

The electronic equipment 20 is configured to recognize whether the customized signal transmitted from the battery 10 is correct and, if the customized signal is incorrect, control the power supplied by the rechargeable power supply 110 to be cut off.

In the system 100, the customized signal is transmitted from the battery 10 to the electronic equipment 20, for the electronic equipment 20 to recognize whether the customized signal is correct. If the customized signal is incorrect, the power supplied by the battery 10 is controlled to be cut off. Thus, the system 100 helps prevent any negative consequences that may be caused by imitation batteries, and achieves the effects of continuing supplying the power from the battery when the battery in usage is an original battery and improving the safety of the battery and the electronic equipment.

Figure 2:
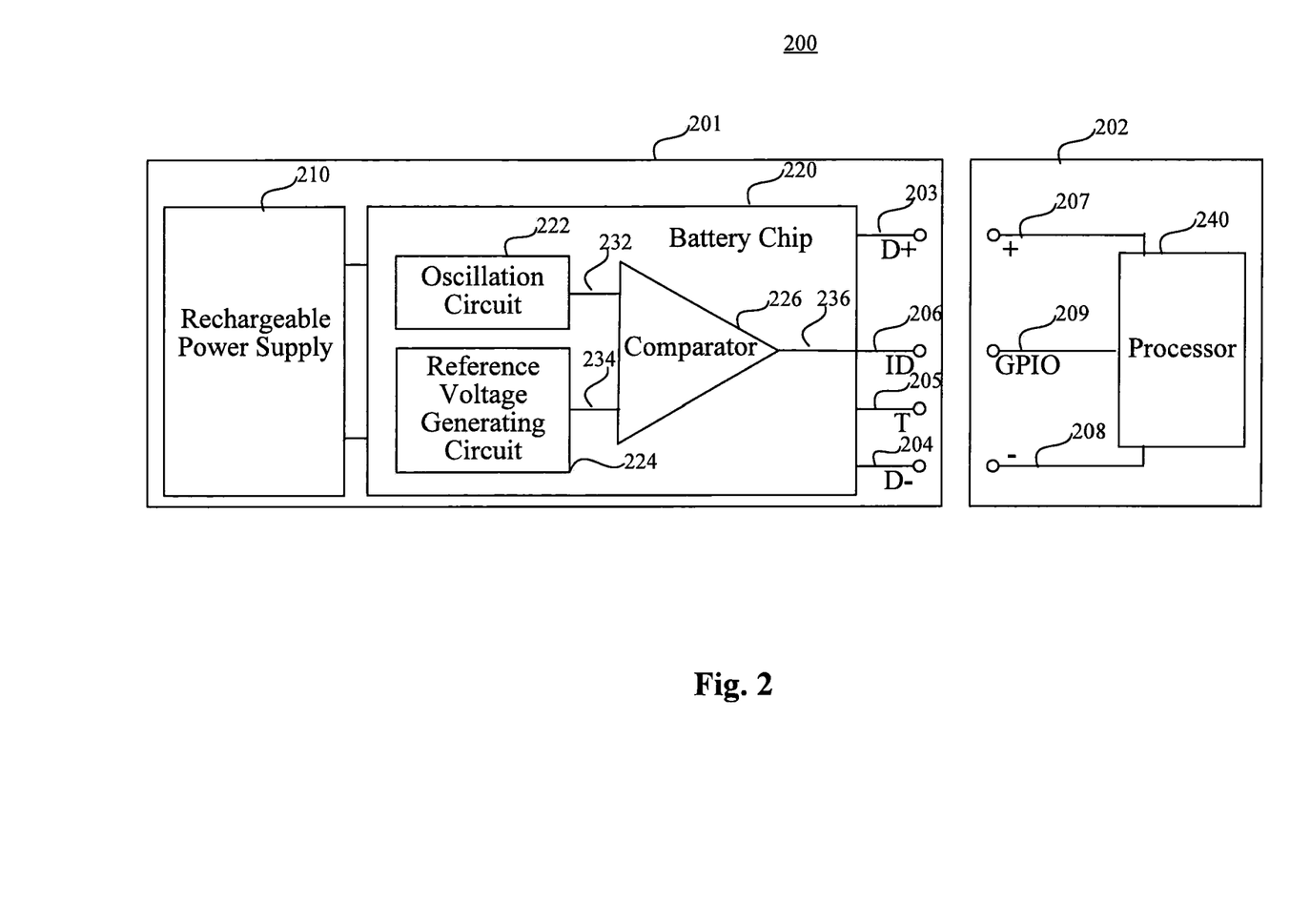
FIG. 2 is a block diagram of a system for battery protection, according to an exemplary embodiment.

FIG. 2 is a block diagram of a system 200 for battery protection, according to an exemplary embodiment. Referring to FIG. 2, the system 200 includes a battery 201 and electronic equipment 202.

In exemplary embodiments, the battery 201 includes first, second, third, and fourth pins 203, 204, 205, and 206 respectively as a positive electrode D+ of power supply, a negative electrode D− of the power supply, a temperature detection pin T, and an identity pin ID. The positive electrode D+ 203 and the negative electrode D− 204 are respectively connected with positive and negative electrodes 207 and 208 of the electronic equipment 202 to constitute a power supply circuit, so as to supply electrical energy to the electronic equipment 202 and facilitate normal operation of the electronic equipment 202. The identity pin ID 206 is connected to a general purpose input output (GPIO) pin 209 of the electronic equipment 202, to transmit a customized signal to the electronic equipment 202.

The battery 201 includes a rechargeable power supply 210 and a battery chip 220.

The rechargeable power supply 210 is configured to supply power to the electronic equipment 202, so as to facilitate the normal operation of the electronic equipment 202.

The battery chip 220 is configured to detect whether the rechargeable power supply 210 has started to supply the power to the electronic equipment 202. If the detection result is that the rechargeable power supply 210 has started to supply the power to the electronic equipment 202, the customized signal is transmitted to the electronic equipment 202 through a predetermined transmitting pin. In the present embodiment, the identity pin ID 206 is taken as an example of the predetermined transmitting pin, but the system 200 is not so limited.

In exemplary embodiments, the battery chip 220 includes a power detecting circuit (not shown) to detect whether the rechargeable power supply 110 has started to supply the power to the electronic equipment 202. The battery chip 220 also includes an oscillation circuit 222, a reference voltage generating circuit 224, and a comparator 226.

The oscillation circuit 222 in the battery chip 220 is configured to generate a sine wave signal. The reference voltage generating circuit 224 is configured to generate a predetermined reference voltage. The sine wave signal and the predetermined reference voltage are input to the comparator 226 to generate the customized signal. For example, the customized signal is a customized timing signal "0101010011." In one exemplary embodiment, the comparator 226 includes first and second input terminals 232 and 234 and an output terminal 236. The first and second input terminals 232 and 234 of the comparator 226 are respectively connected with the oscillation circuit 222 and the reference voltage generating circuit 224, and the output terminal 236 of the comparator 226 is connected with the predetermined transmitting pin, such as the ID pin. The comparator 226, after comparing the sine wave signal with the predetermined reference voltage, generates the customized signal. For example, when the sine wave signal has a voltage value greater than that of the predetermined reference voltage, a high level represented by, e.g., "1," is output, and when the sine wave signal has a voltage value smaller than or equal to that of the predetermined reference voltage, a low level represented by "0," is output. A frequency and an amplitude of the sine wave signal generated by the oscillation circuit 222 and of the predetermined reference voltage generated by the comparator 226 may be set according to actual requirements.

In addition, the predetermined reference voltage generated by the reference voltage generating circuit 224 may be a certain invariable voltage value in a time domain, or may be a continuously changing voltage value in the time domain. Different predetermined reference voltages make the customized signals output by the comparator 226 different from each other. When the predetermined reference voltage is the certain invariable voltage value, the customized signal generated may be, e.g., "10101," and when the predetermined reference voltage is the continuously changing voltage value, the customized signal generated may be, e.g., "11101."

The customized signal output by the comparator 226 passes through the predetermined transmitting pin of the battery 201, e.g., the identity pin ID 206, and a predetermined receiving pin of the electronic equipment 202, e.g., the GPIO pin 209, and is received by a processor 240 of the electronic equipment 202.

The electronic equipment 202 includes the processor 240 and the predetermined receiving pin, such as the GPIO pin 209, wherein the processor 240 is configured to recognize whether the customized signal transmitted from the battery 201 is correct and, if the customized signal is incorrect, control the power supplied by the battery 201 to be cut off.

For example, a timing signal of "111111" may be pre-stored in the processor 240 of the electronic equipment 202. When the electronic equipment 202 receives, through the predetermined receiving pin, the customized signal of "0101010011" transmitted from the battery 201, which is different from the pre-stored "111111" after comparison, this means that the customized signal transmitted from the battery 201 is incorrect. Accordingly, the processor 240 controls the electronic equipment 202 to cut off the power supplied by the battery 201, so as to provide for the safety of the power supply. In one exemplary embodiment, a switch may be set in a power supply circuit on the side of the electronic equipment 202. When the processor 240 recognizes that the customized signal is incorrect, the processor 240 controls the switch in the power supply circuit to be cut off, thereby realizing cutting off of the power supplied by the battery 201. When the electronic equipment 202 receives, through the predetermined receiving pin, the customized signal of "111111" transmitted from the battery 201, the processor 240 permits power to continue to be supplied from the battery 201.

In exemplary embodiments, batteries with a same specification and a same model are set to transmit the same customized signal, and batteries with different specifications or different models are set to transmit different customized signals. Two or more customized signals may be pre-stored in the processor 240 of the electronic equipment 202. When the electronic equipment 202 receives the customized signal transmitted from the battery 201, if the customized signal is the same as one of the two or more pre-stored customized signals, the received customized signal may pass the validation. In this way, the electronic equipment 202 can be compatible with batteries with different sizes or different models.

In exemplary embodiments, to save the electrical energy of the battery 201 and improve a usage time period of the battery 201, after the processor 240 of the electronic equipment 202 recognizes the customized signal transmitted from the battery 201 is correct, the processor 240 may cut off the connection between the predetermined receiving pin and the predetermined transmitting pin of the battery 201, such that the battery 201 stops the transmitting of the customized signal. In one exemplary embodiment, the electrical connection between the predetermined receiving pin of the electronic equipment 202 and the predetermined transmitting pin of the battery 201 is cut off. In one exemplary embodiment, the switch is provided in the power supply circuit receiving the customized signal on the side of the electronic equipment 202. When the customized signal is recognized as correct, the switch is controlled to be cut off. Correspondingly, when the battery chip 220 of the battery 201 detects that the connection between the predetermined transmitting pin and the electronic equipment 202 is cut off, the battery chip 220 may stop the transmitting of the customized signal to the electronic equipment 202.

In exemplary embodiments, when a battery, which may or may not have the function of transmitting the customized signal is connected to the electronic equipment 202, to avoid any negative consequences that may be caused by supplying power to the electronic equipment 202 from the battery, the processor 240 of the electronic equipment 202 detects whether a customized signal transmitted from the battery is received within a predetermined time period, such as a time period after the electronic equipment 202 has finished boot initialization. If no customized signal from the battery is received within the predetermined time period, the processor 240 of the electronic equipment 202 controls the electronic equipment 202 to cut off the power supplied by the battery. If a customized signal transmitted from the battery is received within the predetermined time period, the processor 240 of the electronic equipment 202 recognizes whether the customized signal is correct.

In the system 200, a customized signal is transmitted to the electronic equipment 202 through the predetermined transmitting pin of the battery chip 220, to be recognized by the electronic equipment 202 whether the customized signal is correct and, if the customized signal is incorrect, the power supplied by the battery 201 is controlled to be cut off. Thus, it achieves the effects of keeping on supplying the power from the battery when the battery in usage is an original battery, and improving the safety of the battery and the electronic equipment.

In addition, by cutting off the connection between the predetermined receiving pin of the electronic equipment 202 and the predetermined transmitting pin of the battery 201 when the processor 240 of the electronic equipment 202 has validated that the customized signal is correct, the effects of saving the electrical energy of the battery 201 and improving the usage time period of the battery 201 are achieved. Further, by detecting whether any customized signal transmitted from the battery 201 is received within the predetermined time period and, if no customized signal from the battery is received within the predetermined time period, the processor 240 of the electronic equipment 202 controlling the electronic equipment 202 to cut off the power supplied by the battery 201, batteries having no function of transmitting the customized signal are prevented from supplying power to the electronic equipment 202, thus avoiding negative consequences.

Figure 3:
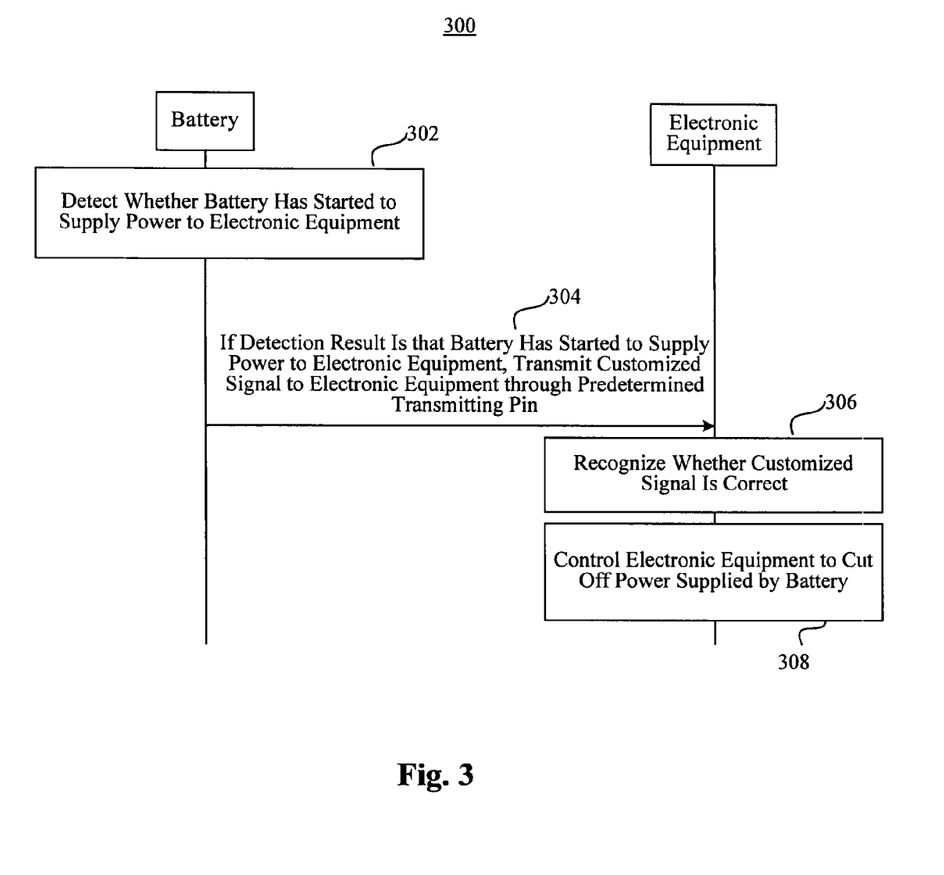
FIG. 3 is a flowchart of a method for battery protection, according to an exemplary embodiment.

FIG. 3 is a flowchart of a method 300 for battery protection, according to an exemplary embodiment. For example, the method 300 may be applied in the system 100 (FIG. 2) or 200 (FIG. 2). Referring to FIG. 3, the method 300 includes the following steps.

In step 302, it is detected whether a battery has started to supply power to electronic equipment. For example, the battery detects itself to determine whether it has started to supply power to the electronic equipment.

In step 304, if the detection result is that the battery has started to supply power to the electronic equipment, a customized signal is transmitted to the electronic equipment through a predetermined transmitting pin. For example, if the detection result is that the battery has started to supply power to the electronic equipment, the battery transmits the customized signal to the electronic equipment through the predetermined transmitting pin. Accordingly, the electronic equipment receives, through a predetermined receiving pin, the customized signal transmitted from the battery.

In step 306, it is recognized whether the customized signal is correct. For example, the electronic equipment recognizes whether the customized signal is correct.

In step 308, if the customized signal is incorrect, the electronic equipment is controlled to cut off the power supplied by the battery.

In the illustrated embodiment, steps 302 and 304 are implemented on the battery side, and steps 306 and 308 are implemented on the electronic equipment side.

In the method 300, the customized signal is transmitted to the electronic equipment through the predetermined transmitting pin of the battery, and is received through the predetermined receiving pin of the electronic equipment. The electronic equipment recognizes whether the customized signal is correct and, if the customized signal is incorrect, the power supplied by the battery is controlled to be cut off. Thus, the method 300 helps prevent any negative consequences that may be caused by imitation batteries, and achieves the effects of keeping on supplying the power from the battery when the battery in usage is an original battery, and improving the safety of the battery and the electronic equipment.

Figure 4:
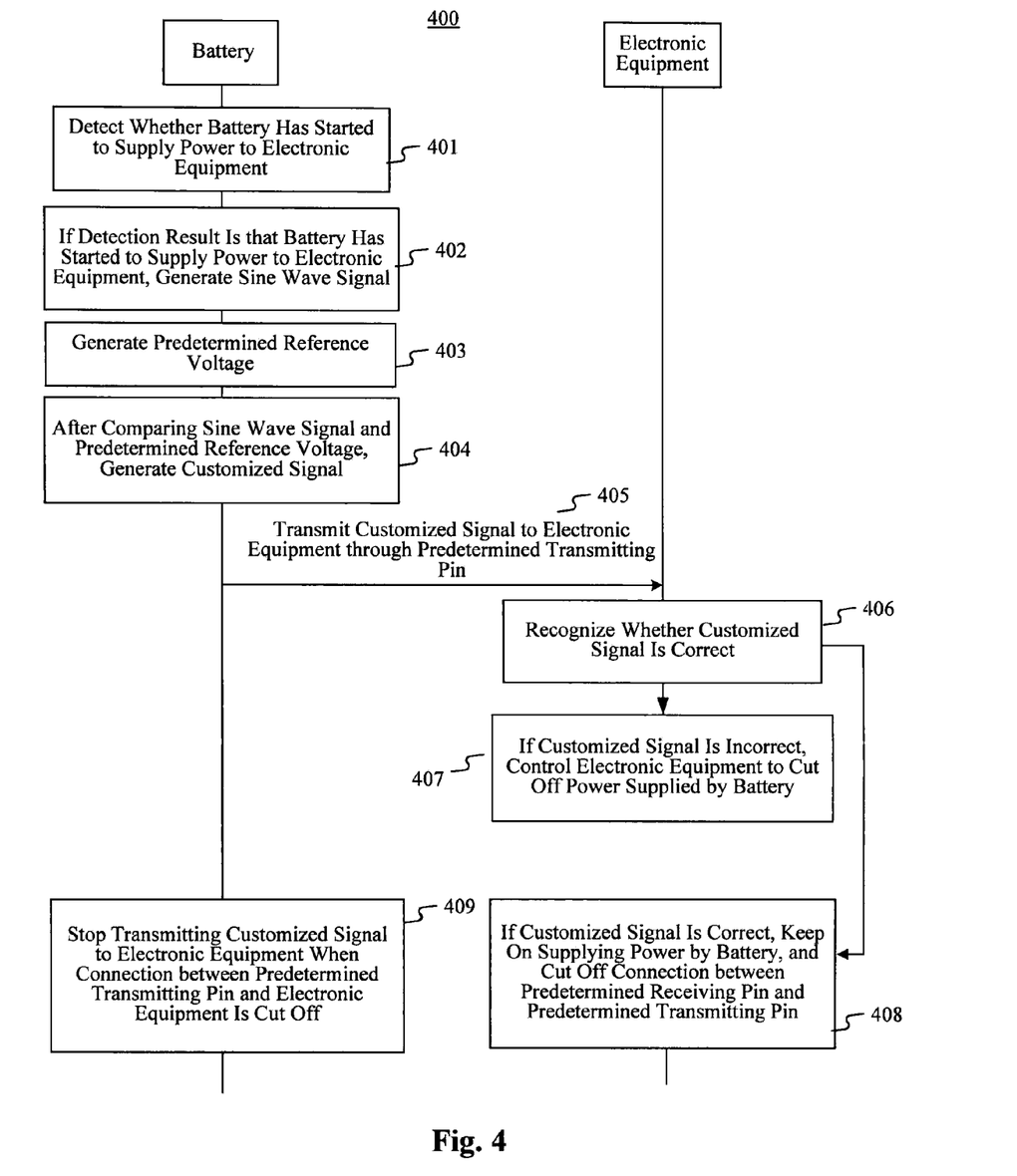
FIG. 4 is a flowchart of a method for battery protection, according to an exemplary embodiment.

FIG. 4 is a flowchart of a method 400 for battery protection, according to an exemplary embodiment. For example, the method 400 may be applied in the system 100 (FIG. 1) or 200 (FIG. 2). Referring to FIG. 4, the method 400 includes the following steps.

In step 401, it is detected whether a battery has started to supply power to electronic equipment. For example, the battery detects itself to determine whether it has started to supply power to the electronic equipment. Also for example, a power detecting circuit may be provided inside the battery to detect whether a rechargeable power supply in the battery has started to supply power to the electronic equipment.

In step 402, if the detection result is that the battery has started to supply power to the electronic equipment, a sine wave signal is generated. For example, if the detection result is that the battery has started to supply power to the electronic equipment, the battery generates the sine wave signal. Also for example, a battery chip of the battery is provided with an oscillation circuit therein, and the oscillation circuit is configured to generate the sine wave signal. After the battery starts to supply power to the electronic equipment, e.g., after a positive electrode D+ and a negative electrode D− of the power supply of the battery have respectively been connected with positive and negative electrodes of the electronic equipment to constitute a power supply circuit, the battery chip generates the sine wave signal with the oscillation circuit.

In step 403, a predetermined reference voltage is generated. For example, the battery generates the predetermined reference voltage with a value of, e.g., 0. Also for example, the battery chip of the battery is provided with a reference voltage generating circuit therein. The reference voltage generating circuit is configured to generate the predetermined reference voltage.

In step 404, after comparing the sine wave signal and the predetermined reference voltage, a customized signal is then generated. For example, the battery compares the sine wave signal with the predetermined reference voltage and generates the customized signal based on the comparison. Also for example, the battery chip of the battery is provided with a comparator therein. The comparator compares the sine wave signal with the predetermined reference voltage, and generates the customized signal based on the comparison. The customized signal may be a customized timing signal consisting of "0" and "1," such as "0101010011." In one exemplary embodiment, batteries with a same specification and a same model are set to generate the same customized signal.

For example, when the sine wave signal has a voltage value greater than the predetermined reference voltage, a high level represented by, e.g., "1," is output, and when the sine wave signal has a voltage value less than or equal to the predetermined reference voltage, a low level represented by, e.g., "0," is output. A frequency and an amplitude of the sine wave signal generated by the oscillation circuit and the predetermined reference voltage generated by the comparator may be set according to actual requirements, and the predetermined reference voltage may be a voltage varying in real time.

In step 405, the customized signal is transmitted to the electronic equipment through a predetermined transmitting pin of the battery. For example, the battery transmits the customized signal through the predetermined transmitting pin to the electronic equipment. Also for example, the battery chip of the battery may transmit the customized signal through an identity pin ID of the battery to the electronic equipment, and a processor of the electronic equipment may receive the customized signal transmitted from the battery through a GPIO pin. Thus, the electronic equipment receives the customized signal transmitted from the battery through the predetermined receiving pin, and the customized signal is transmitted after the battery starts to supply power to the electronic equipment.

In step 406, it is recognized whether the customized signal is correct. For example, the electronic equipment recognizes whether the customized signal is correct. Also for example, a timing signal of "111111" may be pre-stored in the processor of the electronic equipment. When the electronic equipment receives the customized signal of "0101010011" transmitted from the battery through the predetermined receiving pin, because it is different from the pre-stored "111111" after comparison, the customized signal transmitted from the battery is recognized as incorrect.

In step 407, if the customized signal is incorrect, the power supplied by the battery is cut off. For example, if the customized signal is incorrect, the electronic equipment cuts off the power supplied by the battery. Also for example, when the customized signal is incorrect, the processor of the electronic equipment cuts off the power supplied by the battery, so as to provide safety of the power supply. In one exemplary embodiment, a switch may be set in the power supply circuit on the side of the electronic equipment. When the processor recognizes that the customized signal is incorrect, the switch in the power supply circuit is controlled to be cut off, thereby realizing cutting off of the power supplied by the battery.

In step 408, if the customized signal is correct, the power supplied by the battery is kept on, and the connection between the predetermined transmitting pin of the battery and the electronic equipment is cut off. For example, if the customized signal is correct, the electronic equipment keeps on supplying the power from the battery, and cuts off the connection between the predetermined receiving pin and the predetermined transmitting pin of the battery. Also for example, when the electronic equipment receives, through the predetermined receiving pin, the customized signal of "111111" transmitted from the battery, because it is the same as the pre-stored "111111" after comparison, the customized signal transmitted from the battery is recognized as correct. Accordingly, the processor of the electronic equipment permits power to continue to be supplied from the battery, and cuts off the connection between the predetermined receiving pin and the predetermined transmitting pin of the battery. In the illustrated embodiment, after recognizing that the customized signal is correct, to save electrical energy of the battery and improve a usage time period of the battery, the electronic equipment cuts off the connection between the predetermined receiving pin and the predetermined transmitting pin of the battery.

In one exemplary embodiment, the electrical connection between the predetermined receiving pin of the electronic equipment and the predetermined transmitting pin of the battery is cut off. In one exemplary embodiment, the switch is set in the power supply circuit receiving the customized signal on the side of the electronic equipment. When the customized signal is recognized as correct, the switch is controlled to be cut off.

In step 409, when the connection between the predetermined transmitting pin of the battery and the electronic equipment is cut off, the customized signal is stopped from being transmitted to the electronic equipment. For example, when the connection between the predetermined transmitting pin and the electronic equipment is cut off, the battery stops transmitting the customized signal to the electronic equipment. Also for example, when the connection between the predetermined transmitting pin and the electronic equipment is cut off, the power supply circuit transmitting the customized signal of the battery is cut off, and the battery stops transmitting the customized signal to the electronic equipment.

In exemplary embodiments, when a battery, which may or may not have the function of transmitting the customized signal, is connected to the electronic equipment, to avoid any negative consequences that may be caused by supplying power to the electronic equipment from the battery, the processor of the electronic equipment detects whether any customized signal transmitted from the battery is received within a predetermined time period, such as a time period after the electronic equipment has finished boot initialization. If no customized signal from the battery is received within the predetermined time period, the processor of the electronic equipment controls the electronic equipment to cut off the power supplied by the battery. If the customized signal transmitted from the battery is received within the predetermined time period, the processor of the electronic equipment recognizes whether the customized signal is correct.

In the illustrated embodiment, steps 401 to 405 and step 409 are implemented on the battery side, and steps 406 to 408 are implemented on the electronic equipment side.

In the method 400, the customized signal is transmitted to the electronic equipment through the predetermined transmitting pin of the battery chip, and is received through the predetermined receiving pin of the electronic equipment. The electronic equipment recognizes whether the customized signal is correct and, if the customized signal is incorrect, the power supplied by the battery is controlled to be cut off. Thus, the method 400 helps prevent any negative consequences that may be caused by imitation batteries, and achieves the effects of keeping on supplying the power from the battery when the battery in usage is an original battery, and improving safety of the battery and the electronic equipment.

In addition, by cutting off the connection between the predetermined receiving pin of the electronic equipment and the predetermined transmitting pin of the battery when the processor of the electronic equipment has recognized that the customized signal is correct, the effects of saving the electrical energy of the battery and improving the usage time period of the battery are achieved. Further, by detecting whether any customized signal transmitted from the battery is received within the predetermined time period and, if no customized signal from the battery is received within the predetermined time period, the processor of the electronic equipment controlling the electronic equipment to cut off the power supplied by the battery, batteries having no function of transmitting the customized signal are prevented from supplying power to the electronic equipment, thus avoiding negative consequences.

Figure 5:
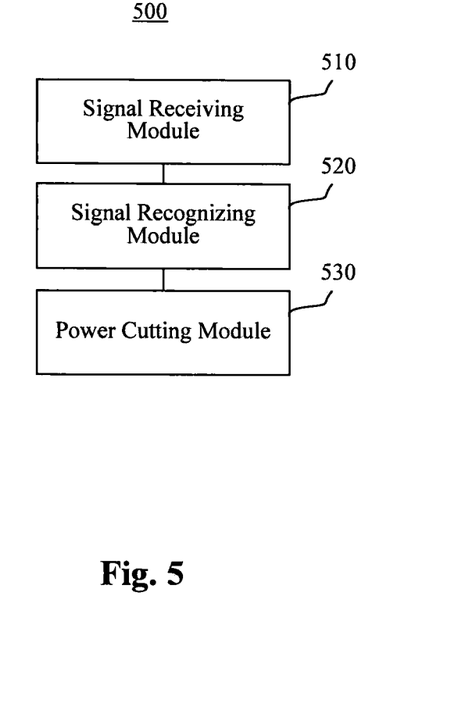
FIG. 5 is a block diagram of a device for battery protection, according to an exemplary embodiment.

FIG. 5 is a block diagram of a device 500 for battery protection, according to an exemplary embodiment. The device 500 may be implemented through software, hardware, or the combination of both, as a part or the whole of a processor of electronic equipment. Referring to FIG. 5, the device 500 includes a signal receiving module 510, a signal recognizing module 520, and a power cutting module 530.

The signal receiving module 510 is configured to receive a customized signal transmitted from a battery through a predetermined receiving pin. The signal recognizing module 520 is configured to recognize whether the customized signal is correct. The power cutting module 530 is configured to control the electronic equipment to cut off the power supplied by the battery, if the customized signal is incorrect.

In the device 500, the customized signal transmitted from the battery is received through the predetermined receiving pin. Whether the customized signal is correct is recognized and, if the customized signal is incorrect, the power supplied by the battery is controlled to be cut off Thus, the device 500 helps prevent any negative consequences that may be caused by imitation batteries, and achieves the effects of keeping on supplying the power from the battery when the battery in usage is an original battery, and improving safety of the battery and the electronic equipment.

Figure 6:
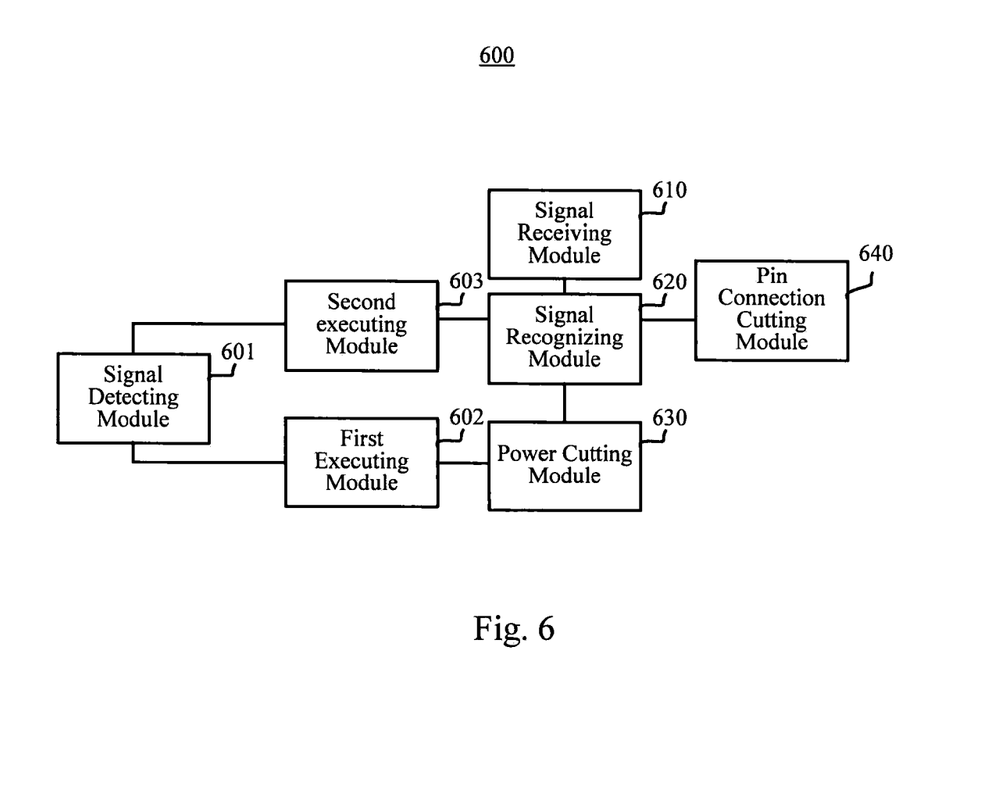
FIG. 6 is a block diagram of a device for battery protection, according to an exemplary embodiment.

FIG. 6 is a block diagram of a device 600 for battery protection, according to an exemplary embodiment. The device 600 may be implemented through software, hardware, or the combination of both, as a part or the whole of a processor of electronic equipment. Referring to FIG. 6, the device 600 includes a signal detecting module 601, a first executing module 602, a second executing module 603, a signal receiving module 610, a signal recognizing module 620, a power cutting module 630, and a pin connection cutting module 640.

The signal detecting module 601 is configured to detect whether a customized signal transmitted from the battery is received within a predetermined time period. For example, the predetermined time period is a time period after the device 600 has finished boot initialization.

The first executing module 602 is configured to trigger the power cutting module 630 to execute an operation, if the customized signal transmitted from the battery is not received within the predetermined time period.

The second executing module 603 is configured to trigger the signal recognizing module 620 to execute an operation, if the customized signal transmitted from the battery is received within the predetermined time period.

The signal receiving module 610 is configured to receive the customized signal transmitted from the battery through a predetermined receiving pin.

The signal recognizing module 620 is configured to recognize whether the customized signal is correct.

The power cutting module 630 is configured to control the electronic equipment to cut off the power supplied by the battery, if the customized signal is incorrect.

The pin connection cutting module 640 is configured to keep on supplying the power from the battery, and cut off the connection between the predetermined receiving pin of the electronic equipment and a predetermined transmitting pin of the battery, if the customized signal is correct.

In the device 600, the customized signal transmitted from the battery is received through the predetermined receiving pin. Whether the customized signal is correct is recognized and, if the customized signal is incorrect, the power supplied by the battery is controlled to be cut off. Thus, the device helps prevents any negative consequences that may be caused by imitation batteries, and achieves the effects of keeping on supplying the power from the battery when the battery in usage is an original battery, and improving safety of the battery and the electronic equipment.

In addition, by cutting off the connection between the predetermined receiving pin of the electronic equipment and the predetermined transmitting pin of the battery when the processor of the electronic equipment has recognized that the customized signal is correct, the effects of saving electrical energy of the battery and improving a usage time period of the battery are achieved. Further, in the device 600, by detecting whether the customized signal transmitted from the battery is received within the predetermined time period and, if the customized signal transmitted from the battery is not received within the predetermined time period, the processor of the electronic equipment controlling the electronic equipment to cut off the power supplied by the battery, batteries having no function of transmitting the customized signal are prevented from supplying power to the electronic equipment, thus avoiding negative consequences.

Figure 7:
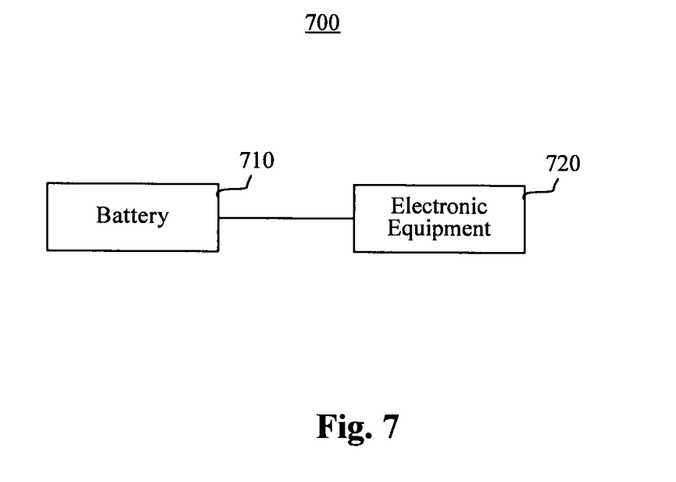
FIG. 7 is a block diagram of a system for battery protection, according to an exemplary embodiment.

FIG. 7 is a block diagram of a system 700 for battery protection, according to an exemplary embodiment. Referring to FIG. 7, the system 700 includes a battery 710 and electronic equipment 720. The electronic equipment 720 includes the device 500 (FIG. 5) or 600 (FIG. 6) for battery protection.

Figure 8:
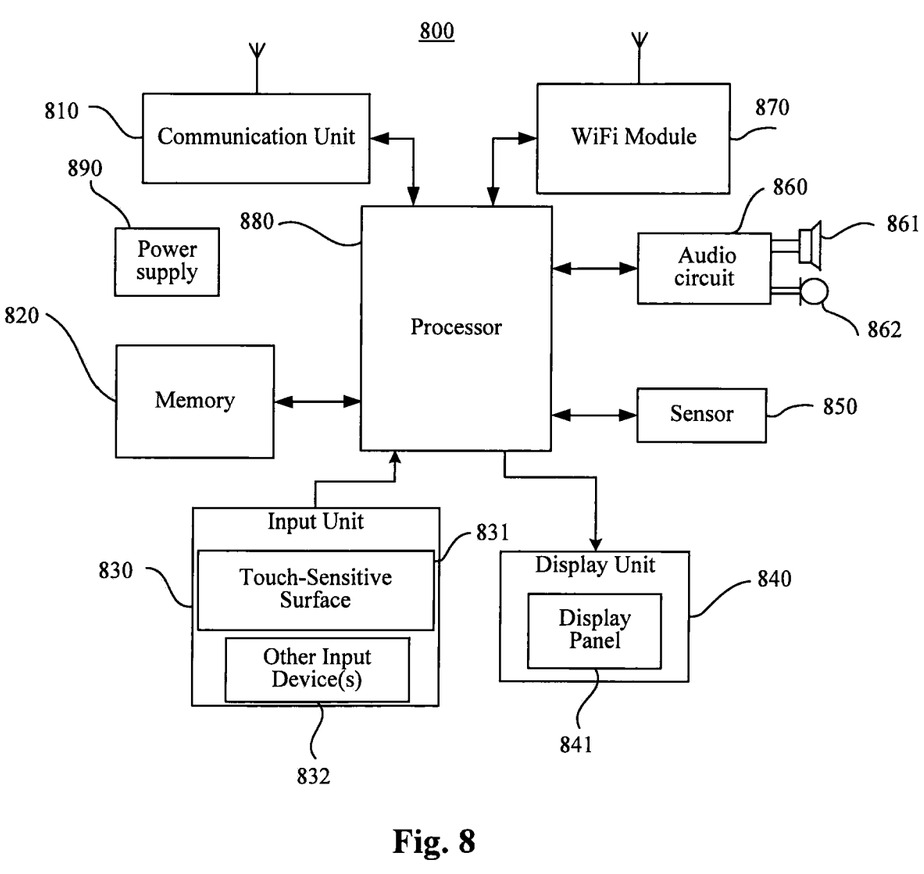
FIG. 8 is a block diagram of electronic equipment, according to an exemplary embodiment.

FIG. 8 is a block diagram of electronic equipment 800, according to an exemplary embodiment. The electronic equipment 800 is configured to implement any of the above-described methods for battery protection.

Referring to FIG. 8, the electronic equipment 800 may include one or more of a communication unit 810, memory resources represented by a memory 820, an input unit 830, a display unit 840, a sensor 850, an audio circuit 860, a wireless fidelity (WiFi) module 870, a processor 880 including one or more processing cores, a power supply 890, etc. Those skilled in the art will understand that the structure of the electronic equipment 800 is not restricted to that shown in FIG. 8, and the electronic equipment 800 may comprise more or less components than those in FIG. 8, or a combination of some components, or different component arrangements.

The communication unit 810 is configured to send and receive signals during sending and receiving of information or a process of calling. The communication unit 810 may be network communication equipment, such as a radio frequency (RF) circuit, a router, a modem or the like. In one exemplary embodiment, when the communication unit 810 is an RF circuit, the communication unit 810 may receive downlink information from a base station, and then send it to the processor 880 to process. In addition, the communication unit 810 may transmit related uplink data to the base station. For example, the RF circuit as the communication unit 810 includes, but is not limited to, an antenna, an amplifier, a tuner, an oscillator, a subscriber identity module (SIM) card, a transceiver, a coupler, a low noise amplifier (LNA), a diplexer and the like. In addition, the communication unit 810 may also communicate with a network and other equipment through wireless communication. The wireless communication may apply any one of the communication standards or protocols, which include but are not limited to global system of mobile communication (GSM), general packet radio service (GPRS), code division multiple access (CDMA), wideband code division multiple access (WCDMA), long term evolution (LTE), E-mail, short messaging service (SMS) or the like.

The memory 820 is configured to store software programs and modules, and the processor 880 executes various function applications and data processing through executing the software programs and modules stored in the memory 820. The memory 820 may mainly include a program storage area and a data storage area. The program storage area may store one or more operating systems, application programs required by at least one function, for example, a voice playing function, an image playing function, etc. The data storage area may store data created according to the applications of the electronic equipment 800, for example, audio data, contact data, etc. In addition, the memory 820 may include a high-speed random access memory, and may also include a nonvolatile storage such as a disk storage, a flash storage, or other volatile solid-state memories. Correspondingly, the memory 820 may also include a memory controller to provide accessing of the processor 880 and the input unit 830 to the memory 820.

The input unit 830 is configured to receive input numerical or character information and generate signal inputs through a keypad, a mouse, an operation rod, optical or trackball related to user settings and function control. For example, the input unit 830 may include a touch-sensitive surface 831 and one or more other input devices 832. The touch sensitive surface 831, also known as a touch display screen or a track pad, may collect touch operations on or near it by the user (for example, the user operations on or near the touch sensitive surface 831 with any suitable object or attachment such as a finger, a touch pen, and the like), and drive a corresponding connection device according to a preset program. Also for example, the touch sensitive surface 831 may include first and second parts, i.e., a touch detecting device and a touch controller. The touch detecting device may detect a touch orientation of the user, and detect a signal caused by the touch operation, and then transmit the signal to the touch controller. The touch controller may receive the touch information from the touch detecting device and convert it into touch point coordinates and then transmit the coordinates to the processor 880. The touch controller also receives and performs instructions from the processor 880. Additionally, the touch sensitive surface 831 may be in various types, such as resistive, capacitive, infrared, or surface acoustic wave and the like. The input unit 830 may also include one or more other input devices 832. For example, the other input devices 832 may include, without limitation, one or more of a physical keypad, functional buttons (such as a volume control button, a switch button and the like), a trackball, a mouse, a joystick and the like.

The display unit 840 is configured to display information input by the user or information provided to the user and various user image interfaces of the electronic equipment 800. The user image interfaces may consist of images, texts, icons, videos and any combinations thereof. The display unit 840 may include a display panel 841 configured by using a liquid crystal display (LCD), an organic light-emitting diode (LCD) and the like. Further, the touch-sensitive surface 831 may cover the display panel 841, and the touch-sensitive surface 831, when detecting a touch operation thereon or nearby, transmits it to the processor 880 to determine a type of the touch operation, for the processor 880 to provide a corresponding visual output on the display panel 841 according to the type of the touch operation. Although the touch-sensitive surface 831 and the display panel 841 are shown as two separated parts to implement input and input functions in FIG. 8, in some embodiments, the touch-sensitive surface 831 and the display panel 841 may be integrated to implement the input and output functions.

The sensor 850 may be an optical sensor, a motion sensor, or any other sensor. The optical sensor may include an environment optical sensor and an approaching sensor. The environment optical sensor may adjust brightness of the display panel 841 according to the brightness of environment light, and the approaching sensor may turn off the display panel 841 and/or the backlight when the electronic equipment 800 moves to near an ear of the user. As an example of the motion sensor, a gravity acceleration sensor may detect magnitudes of an acceleration on respective directions, e.g., along three axes, and detect a value and a direction of the gravity when in stationary state. The gravity acceleration sensor is configured to recognize applications relating to an orientation of the electronic equipment 800 (for example, horizontal and vertical screen switching, related games, magnetometer gesture calibration), vibration-recognizing related functions (for example, a pedometer, knocking) and the like. The electronic equipment 800 may also be configured with other sensors such as a gyro, a barometer, a hygrometer, a thermometer, an infrared sensor and the like.

The audio circuit 860 is coupled to a loudspeaker 861 and a microphone 862, to provide an audio interface between the user and the electronic equipment 800. The audio circuit 860 may transmit an electrical signal converted from received audio data to the loudspeaker 861 to be converted into a voice signal output. On the other hand, the microphone 862 converts a collected voice signal into an electrical signal. The audio circuit 760 receives the electrical signal and converts the received electrical signal into audio data, and then outputs the audio data to the processor 880 to be processed and transmitted to, for example, another electronic equipment through the communication unit 810, or outputs the audio data to the memory 820 to be further processed. The audio circuit 860 may further include an earplug jack to provide communication between an external earphone and the electronic equipment 800.

The WiFi module 870 provides the user with wireless broadband Internet access. For example, the WiFi module 870 may facilitate transmitting or receiving E-mails, browsing web pages, accessing streaming media and the like by the user.

The processor 880 is a control center of the electronic equipment 800 using various interfaces and wires to connect respective portions of the electronic equipment 800. By running or executing software programs and/or modules stored in the memory 820, calling data stored in the memory 820, and executing various functions of the electronic equipment 800 and processing data, the processor 880 handles overall monitoring of the electronic equipment 800. For example, the processor 880 may include one or more processing cores. Also for example, the processor 880 may integrate one or more application processors and one or more modem processors, wherein the application processors may mainly process the operating systems, the user interfaces, the application programs and the like, and the modem processors may mainly process wireless communications. In some embodiments, the modem processors are not integrated into the processor 880.

The power supply 890 is configured to supply power to respective parts of the electronic equipment 800, and to charge the electronic equipment 800 with a battery such as the battery 10 (FIG. 1) or 20 (FIG. 2). For example, the power supply 890 is logically connected with the processor 880 through a power supply management system, thereby realizing functions of managing charging, discharging, or power consumption through the power supply management system. The power supply 890 may also include one or more of a direct current (DC) power supply, an alternating current (AC) power supply, a rechargeable system, a power supply malfunction detecting circuit, a power supply converter, an inverter, a power supply state indicator and the like.

Although not shown, the electronic equipment 800 may also include a camera, a Bluetooth module or the like.

In the present embodiment, the memory 820 stores one or more software programs to be executed by the processor 880, to perform any of the above-described methods for battery protection.

In exemplary embodiments, the electronic equipment described above may be various handheld terminal devices, such as a mobile phone, a personal digital assistant (PDA) and the like.

In exemplary embodiments, there is also provided a non-transitory readable storage medium including instructions, such as included in the memory 820, executable by the processor 880 in the electronic equipment 800, for performing the above-described methods for battery protection. For example, the non-transitory readable storage medium may include a volatile memory, a nonvolatile memory, or both. As an example without limitation, the nonvolatile memory may include a read-only memory (ROM), a programmable ROM (PROM), an electrically programmable read-only memory ROM (EPROM), an electrically erasable programmable ROM (EEPROM) or a flash memory. The volatile memory may include a random access memory (RAM), which may function as an external cache memory. As an example without limitation, the RAM may include a synchronous RAM (SRAM), a dynamic RAM (DRAM), a synchronous DRAM (SDRAM), a double data rate SDRAM (DDR SDRAM), an enhanced SDRAM (ESDRAM), a synchronous link DRAM (SLDRAM) and a directly Rambus RAM (DRRAM). The storage medium in the present disclosure includes but is not limited to the above-noted memories.

One of ordinary skill in the art will understand that the above described modules can each be implemented by hardware, or software, a combination of hardware and software. One of ordinary skill in the art will also understand that multiple ones of the above described modules may be combined as one module, and each of the above described modules may be further divided into a plurality of sub-modules.

In exemplary embodiments, the following components may be used to implement the above described systems and methods for battery protection: a general-purpose processor, a digital signal processor (DSP), a specific integrated circuit (ASIC), a field programmable gate array (FPGA) or other programmable logic devices, a discrete gate or transistor logic, a discrete hardware assembly or any combination of those components. The general-purpose processor may be a microprocessor or any other processor, controller, or microcontroller. The general-purpose processor may also be implemented by a combination of a DSP and a microprocessor, a plurality of microprocessors, one or more microprocessors in conjunction with DSP core, or any other configuration.

Other embodiments of the invention will be apparent to those skilled in the art from consideration of the specification and practice of the invention disclosed here. This application is intended to cover any variations, uses, or adaptations of the invention following the general principles thereof and including such departures from the present disclosure as come within known or customary practice in the art. It is intended that the specification and examples be considered as exemplary only, with a true scope and spirit of the invention being indicated by the following claims.

It will be appreciated that the present invention is not limited to the exact construction that has been described above and illustrated in the accompanying drawings, and that various modifications and changes can be made without departing from the scope thereof. It is intended that the scope of the invention only be limited by the appended claims.

What is claimed is:

1. A battery for electronic equipment, comprising:
   a rechargeable power supply; and
   a battery chip including:
      an oscillation circuit configured to generate a sine wave signal, after the rechargeable power supply starts to supply power to the electronic equipment;
      a reference voltage generating circuit configured to generate a predetermined reference voltage; and
      a comparator having first and second input terminals connected respectively to the oscillation circuit and the reference voltage generating circuit, and an output terminal connected to a predetermined transmitting pin, the comparator being configured to generate a customized signal based on comparing the sine wave signal and the predetermined reference voltage,
   wherein:
   the rechargeable power supply is configured to supply power to the electronic equipment; and
   the battery chip is configured to detect whether the rechargeable power supply has started to supply power to the electronic equipment and, when a detection result is that the rechargeable power supply has started to supply power to the electronic equipment, transmit the customized signal to the electronic equipment through the predetermined transmitting pin.

2. The battery according to claim 1, wherein
   the battery chip is further configured to stop transmitting the customized signal to the electronic equipment, when a connection between the predetermined transmitting pin and the electronic equipment is cut off.

3. The battery according to claim 1, wherein the reference voltage generating circuit is configured to generate the predetermined reference voltage that varies in real time.

4. A method for use in a battery for electronic equipment, comprising:
   detecting whether the battery has started to supply power to the electronic equipment; and
   when a detection result is that the battery has started to supply power to the electronic equipment, transmitting a customized signal to the electronic equipment, wherein the transmitting of the customized signal includes:
   generating a sine wave signal;
   generating a predetermined reference voltage;

comparing the sine wave signal and the predetermined reference voltage, to generate the customized signal; and transmitting the customized signal to the electronic equipment through a predetermined transmitting pin of the battery.

5. The method according to claim 4, further comprising:

when a connection between the predetermined transmitting pin and the electronic equipment is cut off, stopping transmitting the customized signal to the electronic equipment.

6. The method according to claim 4, wherein the generating of the predetermined reference voltage comprises generating the predetermined reference voltage that varies in real time.

7. A method for battery protection for use in electronic equipment, comprising:

receiving a customized signal transmitted from a battery through a predetermined receiving pin;

recognizing whether the customized signal is correct;

when the customized signal is incorrect, controlling the electronic equipment to cut off power supplied by the battery; and when the customized signal is correct, permitting the power to continue to be supplied from the battery, and cutting off a connection between the predetermined receiving pin and a predetermined transmitting pin of the battery.

8. The method according to claim 7, further comprising:

detecting whether the customized signal transmitted from the battery is received within a predetermined time period, wherein the predetermined time period is a time period after the electronic equipment has finished boot initialization;

when no customized signal from the battery is received within the predetermined time period, controlling the electronic equipment to cut off the power supplied by the battery; and when the customized signal transmitted from the battery is received in the predetermined time period, recognizing whether the customized signal is correct.

9. Electronic equipment, comprising:

a processor; and a memory for storing instructions executable by the processor, wherein the processor is configured to:

receive a customized signal transmitted from a battery through a predetermined receiving pin;

recognize whether the customized signal is correct;

when the customized signal is incorrect, control the electronic equipment to cut off power supplied by the battery; and when the customized signal is correct, permit the power to continue to be supplied from the battery and cut off a connection between the predetermined receiving pin and a predetermined transmitting pin of the battery.

10. The electronic equipment according to claim 9, wherein the processor is further configured to:

detect whether the customized signal transmitted from the battery is received within a predetermined time period, wherein the predetermined time period is a time period after the electronic equipment has finished boot initialization;

when no customized signal from the battery is received in the predetermined time period, control the electronic equipment to cut off the power supplied by the battery; and when the customized signal transmitted from the battery is received in the predetermined time period, recognize whether the customized signal is correct.

11. The electronic equipment according to claim 9, being a mobile phone.

12. A non-transitory storage medium having stored therein instructions that, when executed by a processor of electronic equipment, cause the electronic equipment to perform a method for battery protection, the method comprising:

receiving a customized signal transmitted from a battery through a predetermined receiving pin;

recognizing whether the customized signal is correct;

when the customized signal is incorrect, controlling the electronic equipment to cut off power supplied by the battery; and when the customized signal is correct, permitting the power to continue to be supplied from the battery and cutting off a connection between the predetermined receiving pin and a predetermined transmitting pin of the battery.

* * * * *